(12) United States Patent
Nielsen et al.

(10) Patent No.: US 8,374,789 B2
(45) Date of Patent: Feb. 12, 2013

(54) SYSTEMS AND METHODS FOR USING MARKING INFORMATION TO ELECTRONICALLY DISPLAY DISPENSING OF MARKERS BY A MARKING SYSTEM OR MARKING TOOL

(75) Inventors: Steven E. Nielsen, North Palm Beach, FL (US); Curtis Chambers, Palm Beach Gardens, FL (US); Jeffrey Farr, Jupiter, FL (US); Rene A. Vazquez, Herndon, VA (US)

(73) Assignee: Certusview Technologies, LLC, Palm Beach Gardens, FL (US)

( * ) Notice: Subject to any disclaimer, the term of this patent is extended or adjusted under 35 U.S.C. 154(b) by 452 days.

(21) Appl. No.: 12/639,373

(22) Filed: Dec. 16, 2009

(65) Prior Publication Data
US 2010/0090858 A1    Apr. 15, 2010

Related U.S. Application Data

(63) Continuation of application No. 11/696,606, filed on Apr. 4, 2007, now Pat. No. 8,060,304.

(51) Int. Cl.
*G01C 21/00*    (2006.01)
(52) U.S. Cl. ......... 701/517; 701/516; 701/540; 427/137
(58) Field of Classification Search .................. 701/207, 701/517, 516, 540; 427/137
See application file for complete search history.

(56) References Cited

U.S. PATENT DOCUMENTS

| | | | |
|---|---|---|---|
| 3,871,557 A | 3/1975 | Smrt | |
| 3,972,038 A | 7/1976 | Fletcher et al. | |
| 3,974,491 A | 8/1976 | Sipe | |
| 3,988,922 A | 11/1976 | Clark et al. | |
| 4,258,320 A | 3/1981 | Schonstedt | |
| 4,387,340 A | 6/1983 | Peterman | |
| 4,388,592 A | 6/1983 | Schonstedt | |
| 4,520,317 A | 5/1985 | Peterman | |
| 4,536,710 A | 8/1985 | Dunham | |
| 4,539,522 A | 9/1985 | Schonstedt | |
| 4,590,425 A | 5/1986 | Schonstedt | |
| 4,623,282 A | 11/1986 | Allen | |
| 4,639,674 A | 1/1987 | Rippingale | |
| 4,712,094 A | 12/1987 | Bolson, Sr. | |
| 4,747,207 A | 5/1988 | Schonstedt et al. | |
| 4,803,773 A | 2/1989 | Schonstedt | |
| 4,818,944 A | 4/1989 | Rippingale | |

(Continued)

FOREIGN PATENT DOCUMENTS

| CA | 2623761 | 10/2008 |
|---|---|---|
| CA | 2623466 | 6/2011 |

(Continued)

OTHER PUBLICATIONS

International Search Report and Written Opinion, Application Serial No. PCT/US2009/005348, Mar. 2, 2010.

(Continued)

*Primary Examiner* — Mark Hellner
(74) *Attorney, Agent, or Firm* — Foley & Lardner LLP; Joseph Teja, Jr.

(57) ABSTRACT

Marking information relating to the use of a marking system or a marking tool configured to dispense one or more markers to mark, on ground, pavement, or other surface, a location of an underground utility, is used to control a display device so as to visually display a dispensing of the one or more markers on an electronic representation of an area that is marked and includes the location of the underground utility.

29 Claims, 8 Drawing Sheets

U.S. PATENT DOCUMENTS

| | | | |
|---|---|---|---|
| 4,839,623 A | 6/1989 | Schonstedt et al. |
| 4,839,624 A | 6/1989 | Schonstedt |
| 4,873,533 A | 10/1989 | Oike |
| 4,899,293 A | 2/1990 | Dawson et al. |
| 4,989,151 A | 1/1991 | Nuimura |
| 5,001,430 A | 3/1991 | Peterman et al. |
| 5,006,806 A | 4/1991 | Rippingale et al. |
| 5,014,008 A | 5/1991 | Flowerdew |
| 5,017,873 A | 5/1991 | Rippingale et al. |
| 5,025,150 A | 6/1991 | Oldham et al. |
| 5,043,666 A | 8/1991 | Tavernetti et al. |
| 5,045,368 A | 9/1991 | Cosman et al. |
| 5,065,098 A | 11/1991 | Salsman et al. |
| 5,093,622 A | 3/1992 | Balkman |
| 5,097,211 A | 3/1992 | Schonstedt |
| 5,114,517 A | 5/1992 | Rippingale et al. |
| 5,122,750 A | 6/1992 | Rippingale et al. |
| 5,136,245 A | 8/1992 | Schonstedt |
| 5,138,761 A | 8/1992 | Schonstedt |
| 5,150,295 A | 9/1992 | Mattingly |
| 5,173,139 A | 12/1992 | Rippingale et al. |
| 5,206,065 A | 4/1993 | Rippingale et al. |
| 5,214,757 A | 5/1993 | Mauney et al. |
| 5,231,355 A | 7/1993 | Rider et al. |
| 5,239,290 A | 8/1993 | Schonstedt |
| 5,260,659 A | 11/1993 | Flowerdew et al. |
| 5,264,795 A | 11/1993 | Rider |
| 5,299,300 A | 3/1994 | Femal |
| 5,329,464 A | 7/1994 | Sumic et al. |
| 5,361,029 A | 11/1994 | Rider et al. |
| 5,365,163 A | 11/1994 | Satterwhite et al. |
| 5,373,298 A | 12/1994 | Karouby |
| 5,381,338 A | 1/1995 | Wysocki |
| 5,414,462 A | 5/1995 | Veatch |
| 5,430,379 A | 7/1995 | Parkinson et al. |
| 5,444,364 A | 8/1995 | Satterwhite et al. |
| 5,467,271 A | 11/1995 | Abel et al. |
| 5,469,155 A | 11/1995 | Archambeault |
| 5,471,143 A | 11/1995 | Doany |
| 5,486,067 A | 1/1996 | Huynh |
| 5,517,419 A | 5/1996 | Lanckton |
| 5,519,329 A | 5/1996 | Satterwhite |
| 5,529,433 A | 6/1996 | Huynh |
| 5,530,357 A | 6/1996 | Cosman et al. |
| 5,543,931 A | 8/1996 | Lee et al. |
| 5,553,407 A | 9/1996 | Stump |
| 5,568,162 A | 10/1996 | Samsel et al. |
| 5,576,973 A | 11/1996 | Haddy |
| 5,621,325 A | 4/1997 | Draper et al. |
| 5,629,626 A | 5/1997 | Russell et al. |
| 5,644,237 A | 7/1997 | Eslambolchi et al. |
| 5,659,985 A | 8/1997 | Stump |
| 5,673,050 A | 9/1997 | Moussally et al. |
| 5,689,415 A | 11/1997 | Calotychos et al. |
| 5,699,244 A | 12/1997 | Clark, Jr. et al. |
| 5,704,142 A | 1/1998 | Stump |
| 5,739,785 A | 4/1998 | Allison et al. |
| 5,751,289 A | 5/1998 | Myers |
| 5,751,450 A | 5/1998 | Robinson |
| 5,764,127 A | 6/1998 | Hore et al. |
| 5,769,370 A | 6/1998 | Ashjaee |
| 5,815,411 A | 9/1998 | Ellenby et al. |
| 5,819,859 A | 10/1998 | Stump et al. |
| 5,828,219 A | 10/1998 | Hanlon et al. |
| 5,848,373 A | 12/1998 | DeLorme et al. |
| 5,916,300 A | 6/1999 | Kirk et al. |
| 5,917,325 A | 6/1999 | Smith |
| 5,918,565 A | 7/1999 | Casas |
| 5,920,194 A | 7/1999 | Lewis et al. |
| 5,955,667 A | 9/1999 | Fyfe |
| 5,987,380 A | 11/1999 | Backman et al. |
| 6,026,135 A | 2/2000 | McFee et al. |
| 6,031,454 A | 2/2000 | Lovejoy et al. |
| 6,032,530 A | 3/2000 | Hock |
| 6,037,010 A | 3/2000 | Kahmann et al. |
| 6,053,260 A | 4/2000 | Boon |
| 6,061,632 A | 5/2000 | Dreier |
| 6,064,940 A | 5/2000 | Rodgers |
| 6,074,693 A * | 6/2000 | Manning ................ 427/137 |
| 6,095,081 A | 8/2000 | Gochenour |
| 6,101,087 A | 8/2000 | Sutton et al. |
| 6,107,801 A | 8/2000 | Hopwood et al. |
| 6,119,376 A | 9/2000 | Stump |
| 6,127,827 A | 10/2000 | Lewis |
| 6,130,539 A | 10/2000 | Polak |
| 6,138,906 A | 10/2000 | DeMayo |
| 6,140,819 A | 10/2000 | Peterman et al. |
| 6,169,958 B1 | 1/2001 | Nagasamy et al. |
| 6,188,392 B1 | 2/2001 | O'Connor et al. |
| 6,188,777 B1 | 2/2001 | Darrell et al. |
| 6,206,282 B1 | 3/2001 | Hayes, Sr. et al. |
| 6,234,218 B1 | 5/2001 | Boers |
| 6,240,360 B1 | 5/2001 | Phelan |
| 6,268,731 B1 | 7/2001 | Hopwood et al. |
| 6,282,477 B1 | 8/2001 | Gudat et al. |
| 6,285,911 B1 | 9/2001 | Watts et al. |
| 6,292,108 B1 | 9/2001 | Straser et al. |
| 6,294,022 B1 | 9/2001 | Eslambolchi et al. |
| 6,297,736 B1 | 10/2001 | Lewis et al. |
| 6,299,934 B1 | 10/2001 | Manning |
| 6,308,565 B1 | 10/2001 | French et al. |
| 6,320,518 B2 | 11/2001 | Saeki et al. |
| RE37,574 E | 3/2002 | Rawlins |
| 6,356,082 B1 | 3/2002 | Alkire et al. |
| 6,363,320 B1 | 3/2002 | Chou |
| 6,375,038 B1 | 4/2002 | Daansen et al. |
| 6,378,220 B1 | 4/2002 | Baioff et al. |
| 6,388,629 B1 | 5/2002 | Albats et al. |
| 6,390,336 B1 | 5/2002 | Orozco |
| 6,401,051 B1 | 6/2002 | Merriam |
| 6,407,550 B1 | 6/2002 | Parakulam et al. |
| 6,411,094 B1 | 6/2002 | Gard et al. |
| 6,426,872 B1 | 7/2002 | Sutton et al. |
| 6,437,708 B1 | 8/2002 | Brouwer |
| 6,438,239 B1 | 8/2002 | Kuechen |
| 6,459,266 B1 | 10/2002 | Fling |
| 6,476,708 B1 | 11/2002 | Johnson |
| 6,490,524 B1 | 12/2002 | White et al. |
| 6,493,650 B1 | 12/2002 | Rodgers et al. |
| 6,512,478 B1 | 1/2003 | Chien |
| 6,526,400 B1 | 2/2003 | Takata |
| 6,549,011 B2 | 4/2003 | Flatt |
| 6,552,548 B1 | 4/2003 | Lewis et al. |
| 6,585,133 B1 | 7/2003 | Brouwer |
| 6,600,420 B2 | 7/2003 | Goff et al. |
| 6,617,856 B1 | 9/2003 | Royle et al. |
| 6,633,163 B2 | 10/2003 | Fling |
| 6,650,293 B1 | 11/2003 | Eslambolchi et al. |
| 6,650,798 B2 | 11/2003 | Russell et al. |
| 6,658,148 B1 | 12/2003 | Fung et al. |
| 6,674,276 B2 | 1/2004 | Morgan et al. |
| 6,700,526 B2 | 3/2004 | Witten |
| 6,710,741 B2 | 3/2004 | Tucker |
| 6,717,392 B2 | 4/2004 | Pearson |
| 6,723,375 B2 | 4/2004 | Zeck et al. |
| 6,728,662 B2 | 4/2004 | Frost et al. |
| 6,751,552 B1 | 6/2004 | Minelli |
| 6,751,553 B2 | 6/2004 | Young et al. |
| 6,751,554 B1 | 6/2004 | Asher et al. |
| 6,777,923 B2 | 8/2004 | Pearson |
| 6,778,128 B2 | 8/2004 | Tucker et al. |
| 6,798,379 B2 | 9/2004 | Tucker et al. |
| 6,799,116 B2 | 9/2004 | Robbins |
| 6,815,953 B1 | 11/2004 | Bigelow |
| 6,819,109 B2 | 11/2004 | Sowers et al. |
| 6,825,775 B2 | 11/2004 | Fling et al. |
| 6,825,793 B2 | 11/2004 | Taylor, Jr. et al. |
| 6,833,795 B1 | 12/2004 | Johnson et al. |
| 6,833,811 B2 | 12/2004 | Zeitfuss et al. |
| 6,836,231 B2 | 12/2004 | Pearson |
| 6,845,171 B2 | 1/2005 | Shum et al. |
| 6,850,161 B1 | 2/2005 | Elliott et al. |
| 6,850,843 B2 | 2/2005 | Smith et al. |
| 6,853,303 B2 | 2/2005 | Chen et al. |
| 6,853,905 B2 | 2/2005 | Barton |
| 6,865,484 B2 | 3/2005 | Miyasaka et al. |
| 6,895,356 B2 | 5/2005 | Brimhall et al. |

| Patent No. | Date | Name | | App. Pub. No. | Date | Name |
|---|---|---|---|---|---|---|
| 6,898,525 B1 | 5/2005 | Minelli | | 2003/0080897 A1 | 5/2003 | Tranchina |
| 6,898,550 B1 | 5/2005 | Blackadar et al. | | 2003/0100316 A1 | 5/2003 | Odamura |
| 6,904,361 B1 | 6/2005 | Tallman et al. | | 2003/0135328 A1 | 7/2003 | Burns et al. |
| 6,941,890 B1 | 9/2005 | Cristo et al. | | 2003/0168834 A1 | 9/2003 | Ulrich |
| 6,947,028 B2 | 9/2005 | Shkolnikov | | 2003/0184300 A1 | 10/2003 | Bigelow |
| 6,954,071 B2 | 10/2005 | Flatt et al. | | 2003/0196585 A1 | 10/2003 | McDonald et al. |
| 6,956,524 B2 | 10/2005 | Tucker et al. | | 2004/0006425 A1 | 1/2004 | Wood et al. |
| 6,956,564 B1 | 10/2005 | Williams | | 2004/0051368 A1 | 3/2004 | Caputo |
| 6,958,690 B1 | 10/2005 | Asher et al. | | 2004/0057795 A1 | 3/2004 | Mayfield et al. |
| 6,968,296 B2 | 11/2005 | Royle | | 2004/0070535 A1 | 4/2004 | Olsson et al. |
| 6,972,698 B2 | 12/2005 | Deguchi | | 2004/0124988 A1 | 7/2004 | Leonard et al. |
| 6,975,942 B2 | 12/2005 | Young et al. | | 2004/0168358 A1 | 9/2004 | Stump |
| 6,977,508 B2 | 12/2005 | Pearson et al. | | 2004/0203909 A1 | 10/2004 | Koster |
| 6,992,584 B2 | 1/2006 | Dooley et al. | | 2004/0210370 A1 | 10/2004 | Gudat et al. |
| 6,993,088 B2 | 1/2006 | Fling et al. | | 2004/0220731 A1 | 11/2004 | Tucker et al. |
| 6,999,021 B2 | 2/2006 | Taylor, Jr. et al. | | 2004/0225444 A1 | 11/2004 | Young et al. |
| 7,003,138 B2 | 2/2006 | Wilson | | 2005/0023367 A1 | 2/2005 | Reighard |
| 7,009,399 B2 * | 3/2006 | Olsson et al. ............. 324/326 | | 2005/0033513 A1 | 2/2005 | Gasbarro |
| 7,009,519 B2 | 3/2006 | Leonard et al. | | 2005/0034074 A1 | 2/2005 | Munson |
| 7,038,454 B2 | 5/2006 | Gard et al. | | 2005/0038825 A1 | 2/2005 | Tarabzouni |
| 7,042,358 B2 | 5/2006 | Moore | | 2005/0040222 A1 | 2/2005 | Robinson |
| 7,053,789 B2 | 5/2006 | Fling et al. | | 2005/0054457 A1 | 3/2005 | Eyestone et al. |
| 7,057,383 B2 | 6/2006 | Schlapp et al. | | 2005/0055142 A1 | 3/2005 | McMurtry et al. |
| 7,062,414 B2 | 6/2006 | Waite et al. | | 2005/0057745 A1 | 3/2005 | Bontje |
| 7,079,591 B2 | 7/2006 | Fling et al. | | 2005/0150399 A1 | 7/2005 | Wiley |
| 7,091,872 B1 | 8/2006 | Bigelow et al. | | 2005/0156600 A1 | 7/2005 | Olsson |
| 7,113,124 B2 | 9/2006 | Waite | | 2005/0192727 A1 | 9/2005 | Shostak et al. |
| 7,116,244 B2 | 10/2006 | Fling et al. | | 2005/0206562 A1 | 9/2005 | Willson et al. |
| 7,120,564 B2 | 10/2006 | Pacey | | 2005/0232475 A1 | 10/2005 | Floeder |
| 7,142,196 B1 | 11/2006 | Connor et al. | | 2005/0251331 A1 | 11/2005 | Kreft |
| 7,216,034 B2 | 5/2007 | Vitikainen et al. | | 2005/0278371 A1 | 12/2005 | Funk et al. |
| 7,235,980 B2 | 6/2007 | Pearson et al. | | 2006/0026020 A1 | 2/2006 | Waite et al. |
| 7,285,958 B2 | 10/2007 | Overby et al. | | 2006/0055584 A1 | 3/2006 | Waite et al. |
| 7,304,480 B1 | 12/2007 | Pearson | | 2006/0077095 A1 | 4/2006 | Tucker et al. |
| 7,310,584 B2 | 12/2007 | Royle | | 2006/0085133 A1 * | 4/2006 | Young et al. ............. 702/5 |
| 7,319,387 B2 | 1/2008 | Willson et al. | | 2006/0085396 A1 | 4/2006 | Evans et al. |
| 7,331,340 B2 | 2/2008 | Barney | | 2006/0109131 A1 | 5/2006 | Sen et al. |
| 7,336,078 B1 | 2/2008 | Merewether et al. | | 2006/0161349 A1 | 7/2006 | Cross et al. |
| 7,339,379 B2 | 3/2008 | Thompson et al. | | 2006/0169776 A1 | 8/2006 | Hornbaker |
| 7,342,537 B2 | 3/2008 | Pearson et al. | | 2006/0220955 A1 | 10/2006 | Hamilton |
| 7,356,421 B2 | 4/2008 | Gudmundsson et al. | | 2006/0244454 A1 | 11/2006 | Gard et al. |
| 7,358,738 B2 | 4/2008 | Overby et al. | | 2006/0254820 A1 | 11/2006 | Cole et al. |
| 7,372,247 B1 * | 5/2008 | Giusti et al. ............. 324/67 | | 2006/0262963 A1 | 11/2006 | Navulur |
| 7,372,276 B2 | 5/2008 | Mulcahey | | 2006/0276198 A1 | 12/2006 | Michelon et al. |
| 7,396,177 B2 | 7/2008 | Lapstun et al. | | 2006/0276985 A1 | 12/2006 | Xu |
| 7,396,178 B2 | 7/2008 | Lapstun et al. | | 2006/0282191 A1 * | 12/2006 | Gotfried ............. 700/111 |
| 7,400,976 B2 | 7/2008 | Young et al. | | 2006/0282280 A1 | 12/2006 | Stotz et al. |
| 7,403,012 B2 | 7/2008 | Worsley et al. | | 2006/0285913 A1 | 12/2006 | Koptis |
| 7,413,363 B2 | 8/2008 | Lapstun et al. | | 2006/0287900 A1 | 12/2006 | Fiore et al. |
| 7,443,154 B1 | 10/2008 | Merewether et al. | | 2006/0289679 A1 | 12/2006 | Johnson et al. |
| 7,451,721 B1 | 11/2008 | Garza et al. | | 2007/0013379 A1 | 1/2007 | Staples et al. |
| 7,482,973 B2 | 1/2009 | Tucker et al. | | 2007/0018632 A1 | 1/2007 | Royle |
| 7,500,583 B2 | 3/2009 | Cox | | 2007/0031042 A1 | 2/2007 | Simental |
| 7,532,127 B2 | 5/2009 | Holman et al. | | 2007/0040558 A1 | 2/2007 | Overby et al. |
| 7,636,901 B2 | 12/2009 | Munson | | 2007/0100496 A1 | 5/2007 | Forell |
| 7,640,105 B2 | 12/2009 | Nielsen et al. | | 2007/0143676 A1 | 6/2007 | Chen |
| 7,664,530 B2 | 2/2010 | Skelton | | 2007/0219722 A1 * | 9/2007 | Sawyer et al. ............. 702/1 |
| 7,733,077 B1 | 6/2010 | Merewether et al. | | 2007/0223803 A1 | 9/2007 | Shindo |
| 7,773,095 B1 | 8/2010 | Badrak et al. | | 2007/0268110 A1 | 11/2007 | Litte |
| 7,834,801 B2 | 11/2010 | Waite et al. | | 2007/0286021 A1 | 12/2007 | Hoenmans et al. |
| 7,834,806 B2 | 11/2010 | Tucker et al. | | 2007/0288195 A1 | 12/2007 | Waite et al. |
| 7,889,888 B2 | 2/2011 | Deardorr | | 2008/0010009 A1 | 1/2008 | Miyoshi |
| 7,929,981 B2 | 4/2011 | Sangberg | | 2008/0013940 A1 | 1/2008 | Jung |
| 7,978,129 B2 | 7/2011 | Sawyer et al. | | 2008/0109751 A1 | 5/2008 | Fitzmaurice et al. |
| 8,081,112 B2 | 12/2011 | Tucker et al. | | 2008/0125942 A1 | 5/2008 | Tucker et al. |
| 8,106,660 B1 | 1/2012 | Merewether et al. | | 2008/0180322 A1 | 7/2008 | Islam |
| 8,118,192 B2 | 2/2012 | Daugherty | | 2008/0204322 A1 | 8/2008 | Oswald et al. |
| 8,144,245 B2 | 3/2012 | Vik | | 2008/0208415 A1 | 8/2008 | Vik |
| 8,155,390 B2 | 4/2012 | Nielsen et al. | | 2008/0245299 A1 | 10/2008 | Nielsen et al. |
| 2001/0029996 A1 | 10/2001 | Robinson | | 2008/0255795 A1 | 10/2008 | Shkolnikov |
| 2002/0035432 A1 | 3/2002 | Kubica et al. | | 2008/0310721 A1 | 12/2008 | Yang et al. |
| 2002/0052755 A1 | 5/2002 | Whatley et al. | | 2009/0004410 A1 | 1/2009 | Thomson et al. |
| 2002/0053608 A1 | 5/2002 | Zeck et al. | | 2009/0013928 A1 | 1/2009 | Nielsen et al. |
| 2002/0103625 A1 | 8/2002 | Card et al. | | 2009/0063258 A1 | 3/2009 | Mueller et al. |
| 2002/0115472 A1 | 8/2002 | Andress | | 2009/0085568 A1 | 4/2009 | Cole |
| 2002/0122000 A1 | 9/2002 | Bradley et al. | | 2009/0109081 A1 | 4/2009 | Ryerson |
| 2002/0130806 A1 | 9/2002 | Taylor et al. | | 2009/0121933 A1 | 5/2009 | Tucker et al. |
| 2002/0130906 A1 | 9/2002 | Miyaki | | 2009/0171616 A1 | 7/2009 | Zhang et al. |
| 2003/0012411 A1 | 1/2003 | Sjostrom | | 2009/0185858 A1 | 7/2009 | Malit |

| | | |
|---|---|---|
| 2009/0201178 A1 | 8/2009 | Nielsen et al. |
| 2009/0201311 A1 | 8/2009 | Nielsen et al. |
| 2009/0202101 A1 | 8/2009 | Nielsen et al. |
| 2009/0202110 A1 | 8/2009 | Nielsen et al. |
| 2009/0202111 A1 | 8/2009 | Nielsen et al. |
| 2009/0202112 A1 | 8/2009 | Nielsen et al. |
| 2009/0204238 A1 | 8/2009 | Nielsen et al. |
| 2009/0204466 A1 | 8/2009 | Nielsen et al. |
| 2009/0204614 A1 | 8/2009 | Nielsen et al. |
| 2009/0204625 A1 | 8/2009 | Chambers et al. |
| 2009/0207019 A1 | 8/2009 | Nielsen et al. |
| 2009/0208642 A1 | 8/2009 | Nielsen et al. |
| 2009/0210098 A1 | 8/2009 | Nielsen et al. |
| 2009/0210245 A1 | 8/2009 | Wold |
| 2009/0210284 A1 | 8/2009 | Nielsen et al. |
| 2009/0210285 A1 | 8/2009 | Nielsen et al. |
| 2009/0210297 A1 | 8/2009 | Nielsen et al. |
| 2009/0210298 A1 | 8/2009 | Nielsen et al. |
| 2009/0237408 A1 | 9/2009 | Nielsen et al. |
| 2009/0238414 A1 | 9/2009 | Nielsen et al. |
| 2009/0238415 A1 | 9/2009 | Nielsen et al. |
| 2009/0238416 A1 | 9/2009 | Nielsen et al. |
| 2009/0238417 A1 | 9/2009 | Nielsen et al. |
| 2009/0241045 A1 | 9/2009 | Nielsen et al. |
| 2009/0241046 A1 | 9/2009 | Nielsen et al. |
| 2009/0324815 A1 | 12/2009 | Nielsen et al. |
| 2009/0327024 A1 | 12/2009 | Nielsen et al. |
| 2010/0006667 A1 | 1/2010 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0045517 A1 | 2/2010 | Tucker et al. |
| 2010/0070347 A1 | 3/2010 | Chen |
| 2010/0084532 A1 | 4/2010 | Nielsen et al. |
| 2010/0085054 A1 | 4/2010 | Nielsen et al. |
| 2010/0085376 A1 | 4/2010 | Nielsen et al. |
| 2010/0085694 A1 | 4/2010 | Nielsen et al. |
| 2010/0085701 A1 | 4/2010 | Nielsen et al. |
| 2010/0086671 A1 | 4/2010 | Nielsen et al. |
| 2010/0086677 A1 | 4/2010 | Nielsen et al. |
| 2010/0088031 A1 | 4/2010 | Nielsen et al. |
| 2010/0088032 A1 | 4/2010 | Nielsen et al. |
| 2010/0088134 A1 | 4/2010 | Nielsen et al. |
| 2010/0088135 A1 | 4/2010 | Nielsen et al. |
| 2010/0088164 A1 | 4/2010 | Nielsen et al. |
| 2010/0090700 A1 | 4/2010 | Nielsen et al. |
| 2010/0094553 A1 | 4/2010 | Nielsen et al. |
| 2010/0097224 A1 | 4/2010 | Prodanovich |
| 2010/0117654 A1 | 5/2010 | Nielsen et al. |
| 2010/0131903 A1 | 5/2010 | Thomson et al. |
| 2010/0146454 A1 | 6/2010 | Sugahara |
| 2010/0161359 A1 | 6/2010 | Asher |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188245 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0201706 A1 | 8/2010 | Nielsen et al. |
| 2010/0205031 A1 | 8/2010 | Nielsen et al. |
| 2010/0205032 A1 | 8/2010 | Nielsen et al. |
| 2010/0205195 A1 | 8/2010 | Nielsen et al. |
| 2010/0205264 A1 | 8/2010 | Nielsen et al. |
| 2010/0205536 A1 | 8/2010 | Nielsen et al. |
| 2010/0205554 A1 | 8/2010 | Nielsen et al. |
| 2010/0205555 A1 | 8/2010 | Nielsen et al. |
| 2010/0207816 A1 | 8/2010 | Islam et al. |
| 2010/0211354 A1 | 8/2010 | Park et al. |
| 2010/0228588 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0255182 A1 | 10/2010 | Nielsen et al. |
| 2010/0256825 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |
| 2010/0263591 A1 | 10/2010 | Nielsen et al. |
| 2010/0268786 A1 | 10/2010 | Nielsen et al. |
| 2010/0272885 A1* | 10/2010 | Olsson et al. .................. 427/137 |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2010/0324967 A1 | 12/2010 | Nielsen et al. |
| 2011/0006772 A1 | 1/2011 | Olsson |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0046999 A1 | 2/2011 | Nielsen et al. |
| 2011/0060496 A1 | 3/2011 | Nielsen et al. |
| 2011/0060549 A1 | 3/2011 | Nielsen et al. |
| 2011/0095885 A9 | 4/2011 | Nielsen et al. |
| 2011/0117272 A1 | 5/2011 | Nielsen et al. |
| 2011/0131081 A1 | 6/2011 | Nielsen et al. |
| 2011/0137769 A1 | 6/2011 | Nielsen et al. |
| 2011/0191058 A1 | 8/2011 | Nielsen et al. |
| 2011/0236588 A1 | 9/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0282542 A9 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |
| 2012/0113244 A1 | 5/2012 | Nielsen et al. |
| 2012/0274476 A1 | 11/2012 | Nielsen et al. |

FOREIGN PATENT DOCUMENTS

| | | |
|---|---|---|
| CH | 695087 A5 | 12/2005 |
| EP | 0636393 A1 | 2/1995 |
| EP | 1521331 | 4/2005 |
| EP | 1852365 A1 | 11/2007 |
| EP | 1974638 | 10/2008 |
| GB | 2266863 A | 11/1993 |
| JP | 10060865 | 3/1998 |
| JP | 2000501666 | 2/2000 |
| JP | 2002079167 | 3/2002 |
| WO | WO-9112119 | 8/1991 |
| WO | WO-9424584 | 10/1994 |
| WO | WO-9516827 | 6/1995 |
| WO | WO-9629572 | 9/1996 |
| WO | WO-9854600 | 12/1998 |
| WO | WO-9854601 | 12/1998 |
| WO | WO-9900679 | 1/1999 |
| WO | WO0194016 | 12/2001 |
| WO | WO0228541 | 4/2002 |

| | | | |
|---|---|---|---|
| WO | WO-2004100044 A1 | 11/2004 |
| WO | WO-2004102242 A1 | 11/2004 |
| WO | WO-2005052627 A2 | 6/2005 |
| WO | WO-2006015310 A2 | 2/2006 |
| WO | WO-2006136776 A1 | 12/2006 |
| WO | WO-2006136777 A1 | 12/2006 |
| WO | WO-2007067898 A2 | 6/2007 |

OTHER PUBLICATIONS

Bearden, T., "New Identification Technology Raises Concerns over Privacy," PBS Online NewsHour Report, Aug. 17, 2006, pp. 1-5, http://www.pbs.org/newshour/bb/science/july-dec06/rfid_08-17.html.

Carey, B., "Tracking Shoes," Chicago Tribune Online Edition, Jan. 29, 2007, pp. 1-3, http://www.chicagotribune.com/services/site/premium/access-registered.intercept.

Co-Pending U.S. Appl. No. 12/363,046, filed Jan. 30, 2009.
Co-pending U.S. Appl. No. 12/236,688, filed Sep. 24, 2008.
Co-pending U.S. Appl. No. 12/363,951, filed Feb. 2, 2009.
Co-pending U.S. Appl. No. 12/364,339, filed Feb. 2, 2009.
Co-pending U.S. Appl. No. 12/364,359, filed Feb. 2, 2009.
Co-pending U.S. Appl. No. 12/364,369, filed Feb. 2, 2009.
Co-pending U.S. Appl. No. 12/429,929, filed Apr. 24, 2009.
Co-pending U.S. Appl. No. 12/539,497, filed Aug. 11, 2009.
Co-Pending U.S. Appl. No. 12/568,087, filed Sep. 28, 2009.
Co-Pending U.S. Appl. No. 12/607,843, filed Oct. 28, 2009.
Co-Pending U.S. Appl. No. 12/609,275, filed Oct. 30, 2009.
Co-pending U.S. Appl. No. 12/622,768, filed Nov. 20, 2009.
Co-pending U.S. Appl. No. 12/639,041, filed Dec. 16, 2009.
Co-pending U.S. Appl. No. 11/696,606, filed Apr. 4, 2007.

Fox, G. et al., "GPS Provides Quick, Accurate Data for Underground Utility Location," as featured in Apr. 2002 issue of Trenchless Technology, http://www.woolpert.com/asp/articles/GPS-Provides.asp, Sep. 14, 2007, pp. 1 and 2.

International Search Report and Written Opinion, Application Serial No. PCT/US2008/55796, Oct. 14, 2008.

International Search Report and Written Opinion, Application Serial No. PCT/US2008/55798, Jul. 28, 2008.

Office Action mailed Apr. 28, 2009 from Co-Pending U.S. Appl. No. 11/685,602.

Office Action dated Sep. 17, 2009 from Co-Pending U.S. Appl. No. 11/685,602.

Trimble Navigation Limited, "H-Star Technology Explained," pp. 1-9, 2005, www.trimble.com.

Co-Pending U.S. Appl. No. 12/649,535, filed Dec. 30, 2009.

ESRI Corporate Introduction, http://www.esri.com/library/brochures/pdfs/corporate-intro.pdf, printed on Dec. 9, 2009 (original publication date unknown).

International Search Report and Written Opinion, Application Serial No. PCT/US2009/005299, Dec. 12, 2009.

Notice of Allowance dated Nov. 6, 2009 from Co-Pending U.S. Appl. No. 11/685,602.

Office Action dated Nov. 18, 2009 from Co-Pending Canadian Application No. 2,623,466, filed Mar. 4, 2008.

Office Action dated Nov. 23, 2009 from Co-Pending Canadian Application No. 2,623,761, filed Mar. 4, 2008.

CGA, Common Ground Alliance, Best Practices, Version 1.0, Apr. 2003.

CGA, Common Ground, Study of One-Call Systems and Damage Prevention Best Practices, Aug. 1999.

International Search Report and Written Opinion, Application Serial No. PCT/US2009/000859, Apr. 14, 2009.

Pevarski, R., Virginia Pilot Project: Technology Meets Damage Prevention, http://www.excavationsafetyonline.com/esg/guidePDFs/2009_2009_ESG_Page_9.pdf, printed on Nov. 3, 2009, 1 page.

Virginia Pilot Project, Incorporating GPS Technology to Enhance One-Call Damage Prevention, Phase I—Electronic White Lining Project Report, Nov. 2007, 50 pages.

International Search Report and Written Opinion, Application Serial No. PCT/US2009/005359, Feb. 8, 2010.

Bernold, L.. et al. "Equipment operator training in the age of internet2," Proceedings of 19th International Symposium on Automation and Robotics in Construction (ISARC 2002), Sep. 2002 [retrieved on Nov. 12, 2010]. Retrieved from the Internet: <URL: http://fire.nist.gov/bfrlpubsibuild02lPDF/b02059.pdf>. p. 4, col. 2, para 2.

European Search Report, Application No. 08743671.3, Nov. 16, 2011.

European Search Report, Application No. 08743673.9, Feb. 28, 2011.

GPS Technology Enhancing Underground Utility Locating, Underground Construction Magazine, Apr. 7, 2010, 4 pages, http://www.undergroundconstructionmagazine.com/print/1034?page=show.

International Search Report and Written Opinion, Application No. PCT/2010/000389, Jun. 2, 2010.

International Search Report and Written Opinion, Application No. PCT/US10/45161, Oct. 29, 2010.

International Search Report and Written Opinion, Application No. PCT/US10/45409, Nov. 18, 2010.

International Search Report and Written Opinion, Application No. PCT/US10/45969, Nov. 18, 2010.

International Search Report and Written Opinion, Application No. PCT/US2009/003957, Mar. 21, 2011.

International Search Report and Written Opinion, Application No. PCT/US2010/036029, Sep. 3, 2010.

International Search Report and Written Opinion, Application No. PCT/US2011/047807, Dec. 6, 2011.

Jung, H.G., Structure Analysis Based Parking Slot Marking Recognition for Semi-automatic Parking System, Springer-Verlag Berlin Heidelberg 2006, 10 pages.

Luczak, S., "Increasing Accuracy of Tilt Measurements," Engineering Mechanics, vol. 14, 2007, p. 143-154.

MALA Application Note—Using Mala GPR systems with GPS equipment, Printed Matter No. 2894, 5 pages, www.malags.se, printed Apr. 9, 2010 (original publication date unknown).

MALA Application Note—Visualizing GPR data in Google Earth using MALA GPS Mapper, Printed Matter No. 2896, 3 pages, www.malags.se, printed Apr. 9, 2010 (original publication date unknown).

MALA GPS Mapper—Processing, 1 page, http://www.malags.se/Downloads/Software/processing/MALA-GPS-Mapper.aspx, printed on Apr. 9, 2010 (original publication date unknown).

MALA GPS Mapper—Product Releases, Sep. 19, 2007, 1 page, http://www.malags.se/News-and-Events/Product-Releases/MALA-GPS-Mapper.aspx, printed Apr. 9, 2010.

MALA Object Mapper™—Processing, 1 page, http://www.malags.se/Downloads/Software/Processing/Object-Mapper.aspx, printed Apr. 9, 2010 (original publication date unknown).

New Mexico's Recommended Marking Guidelines for Underground Utilities, May 2006, 8 pages.

Notice of Allowance dated Jan. 24, 2012 from U.S. Appl. No. 12/363,951.

Notice of Allowance dated Mar. 9, 2012 from U.S. Appl. No. 12/236,688.

Notice of Allowance dated May 2, 2012 from U.S. Appl. No. 12/429,929.

Notice of Allowance dated Jul. 12, 2012 from U.S. Appl. No. 12/539,497.

Notice of Allowance dated Aug. 1, 2012 from U.S. Appl. No. 12/364,339.

Notice of Allowance dated Aug. 25, 2011 from U.S. Appl. No. 11/696,606.

Notice of Allowance dated Sep. 5, 2012 from U.S. Appl. No. 12/854,370.

Notice of Allowance dated Apr. 28, 2011 from U.S. Appl. No. 29/356,631.

Notice of Allowance dated Jan. 25, 2012 from Canadian Application No. 2,710,189.

Notice of Allowance dated Nov. 12, 2010 from U.S. Appl. No. 29/356,633.

Notice of Allowance dated Nov. 12, 2010 from U.S. Appl. No. 29/356,634.

Notice of Allowance dated Nov. 12, 2010 from U.S. Appl. No. 29/356,635.

Notice of Allowance dated Nov. 28, 2011 from Canadian Application No. 2,710,269.

Office Action dated Jan. 12, 2012 from U.S. Appl. No. 12/364,369.
Office Action dated Jan. 25, 2012 from U.S. Appl. No. 12/568,087.
Office Action dated Feb. 1, 2011 from Canadian Application No. 2,691,707.
Office Action dated Feb. 9, 2012 from U.S. Appl. No. 12/364,339.
Office Action dated Feb. 28, 2012 from U.S. Appl. No. 12/539,497.
Office Action dated Mar. 2, 2012 from U.S. Appl. No. 12/639,041.
Office Action dated Mar. 13, 2012 from U.S. Appl. No. 12/364,359.
Office Action dated Mar. 29, 2012 from GB Application No. 1107052.1.
Office Action dated Apr. 10, 2012 from U.S. Appl. No. 12/854,370.
Office Action dated Apr. 12, 2012 from Canadian Application No. 2,691,707.
Office Action dated Apr. 13, 2012 from Australian Application No. 2008236526.
Office Action dated Apr. 17, 2012 from U.S. Appl. No. 12/607,843.
Office Action dated Apr. 25, 2012 from U.S. Appl. No. 12/363,046.
Office Action dated May 1, 2012 from Australian Application No. 2009300362.
Office Action dated May 15, 2012 from U.S. Appl. No. 12/797,243.
Office Action dated May 17, 2012 from U.S. Appl. No. 12/364,369.
Office Action dated Jun. 1, 2012 from U.S. Appl. No. 12/855,977.
Office Action dated Jun. 4, 2012 from U.S. Appl. No. 12/568,087.
Office Action dated Jun. 4, 2012 from U.S. Appl. No. 12/703,958.
Office Action dated Jun. 8, 2012 from U.S. Appl. No. 12/639,041.
Office Action dated Jun. 16, 2010 from Canadian Application No. 2,691,707.
Office Action dated Jun. 18, 2012 from U.S. Appl. No. 12/701,468.
Office Action dated Jun. 18, 2012 from U.S. Appl. No. 12/701,496.
Office Action dated Jul. 2, 2012 from U.S. Appl. No. 12/797,262.
Office Action dated Jul. 12, 2012 from U.S. Appl. No. 12/571,411.
Office Action dated Jul. 27, 2012 from European Application No. 08743671.3.
Office Action dated Aug. 15, 2012 from Australian Application No. 2010214104.
Office Action dated Aug. 29, 2012 from U.S. Appl. No. 12/701,447.
Office Action dated Sep. 4, 2012 from U.S. Appl. No. 12/622,768.
Office Action dated Sep. 26, 2011 from Canadian Application No. 2,739,119.
Office Action dated Sep. 26, 2011 from Canadian Application No. 2,739,320.
Office Action dated Oct. 4, 2011 from U.S. Appl. No. 12/364,359.
Office Action dated Oct. 20, 2011 from U.S. Appl. No. 12/639,041.
Office Action dated Oct. 24, 2011 from U.S. Appl. No. 12/236,688.
Office Action dated Nov. 9, 2011 from U.S. Appl. No. 12/429,929.
Office Action dated Nov. 15, 2011 from Canadian Application No. 2,691,707.
Office Action dated Dec. 30, 2011 from U.S. Appl. No. 12/701,447.
Office Action dated Jul. 20, 2010 from U.S. Appl. No. 11/696,606.
Office Action dated Jul. 11, 2011 from Canadian Application No. 2713282.
Office Action dated Jun. 28, 2011 from Canadian Application No. 2710269.
Office Action dated Mar. 3, 2011 from Australian Application No. 2008226627.
Office Action dated Mar. 9, 2011 from Australian Application No. 2008236526.
Office Action dated Oct. 6, 2010 from Canadian Application No. 2623761.
Product Data, Hard Hat Aerosols Marking Paint 2300; Rust-oleum Netherlands B.V., Apr. 2005, 1 page, http://www.rustoleum.co.uk/downloads/2300%20Marking%20Spray.pdf.
Product Data, "Inverted Marking Chalk," Rust-oleum, Jul. 2004, 2 pages, http://www.policeone.com/pdfs/markingchalkinfo_ro.pdf.
Virginia Underground utility marking standard, Mar. 2004, 20 pages.
3M Dynatel, Brochure, 2006, 1-4.
3M Dynatel, Locating and Marking System, Brochure, 2007, 1-16.
ArcFM, White Paper, 2006, 1-28.
ArcGIS 9, Geocoding in ArcGIS, Manual, 2004, 1-192.
ArcPad, Mobile GIS Software for Field Mapping Applications, brochure, 2006, http://www.esri.com/library/brochures/pdfs/arcpadbro.pdf.
ArcPad: Mobile GIS, ESRI White Paper, Sep. 2004, 1-17, http://www.esri.com/library/whitepapers/pdfs/arcpad.pdf.
DigiTerra Explorer, brochure, v. 6, 2009, 1-2.
DigiTerra Explorer, User Manual, v. 5, 2007, 1-64.
MobileMapper 6 vs. Juno SC in Real World Conditions, White Paper, 2009 1-16, http://www.sidwellco.com/php/gps_solutions/docs/MM6_vs_Juno_WP_en.pdf.
MobileMapper 6, brochure, 2008, 1-4.
Notice of Allowance dated Oct. 1, 2012 from U.S. Appl. No. 12/607,843.
Office Action dated Sep. 21, 2012 from U.S. Appl. No. 12/797,202.
Office Action dated Sep. 25, 2012 from Australian Application No. 2010214053.
Office Action dated Oct. 15, 2012 from U.S. Appl. No. 12/797,227.
Office Action dated Oct. 19, 2012 from U.S. Appl. No. 12/797,243.
Office Action dated Oct. 22, 2012 from U.S. Appl. No. 12/609,275.
Olsson, Office Action dated Sep. 13, 2012 from U.S. Appl. No. 12/827,993.
Trimble Comprehensive Utilities, brochure, 2010, 1-6.
Office Action dated Oct. 2, 2012 from Japanese Application No. 2010-502170.
Office Action dated Nov. 14, 2012 from Canadian Application No. 2,750,908.
Office Action dated Nov. 20, 2012 from U.S. Appl. No. 12/701,468.
Office Action dated Nov. 21, 2012 from U.S. Appl. No. 12/649,535.
Office Action dated Nov. 21, 2012 from U.S. Appl. No. 12/701,496.
Office Action dated Nov. 23, 2012 from U.S. Appl. No. 12/855,977.
Office Action dated Nov. 26, 2012 from U.S. Appl. No. 12/764,164).

* cited by examiner

| MARKER CHARACTERISTIC(S) 610 | TIMESTAMP 620 |
|---|---|
| (YELLOW PAINT) | (2005-10-30 10:45) |

ENTRY {

Figure 6A

SYSTEMS AND METHODS FOR USING MARKING INFORMATION TO ELECTRONICALLY DISPLAY DISPENSING OF MARKERS BY A MARKING SYSTEM OR MARKING TOOL

CROSS-REFERENCE TO RELATED APPLICATION

The application claims the benefit, under 35 U.S.C. §120, as a continuation (CON) of U.S. Non-provisional application Ser. No. 11/696,606 filed Apr. 4, 2007, entitled "Marking System and Method," which application is incorporated by reference herein in its entirety.

BACKGROUND

Underground man-made objects, such as utility lines and pipes (hereinafter "utility lines"), are very susceptible to damage from excavation activities. Local and federal laws require that notification be given to owners of underground utility lines in an area to be excavated before any excavation takes place. The owners of the utility lines typically must locate and mark the location of any underground utility lines.

The tasks of locating and marking underground utility lines can be performed by either the utility line owner or by third party contractors. A marking tool is typically used to mark the ground, pavement or other surfaces in order to provide a visual indication of the location of underground utilities. Paint is commonly used as the marker, and it is typically applied using a paint marking tool. The color of the paint is typically chosen based on the type of utility line being marked (e.g., red for a power line). However, other types of markers, such as other types of liquids, flags and stakes are also used, and different visual or other characteristics of the marker are used for representing different types of underground utility lines. For example, the color, shape or other characteristic of a flag marker can represent a particular type of underground utility line (e.g., a square shaped flag can be used to mark a power line).

When paint is used as the marker, a worker marks the location of an underground utility line using a paint marking tool to spray paint on the ground above the utility line. The paint marking tools typically used have a paint canister holder that is adapted to hold a single aerosol can of paint in an axial orientation with respect to the long axis of the aerosol can. The paint marking tool is typically designed to enable a user to walk or stand erect while dispensing the paint.

When an underground utility line is located, the worker will load a paint can of the appropriate color for the utility line being marked into the paint marking tool. When it is time to mark a different type of utility line, the worker must change the paint can to one of the appropriate color for the new utility line being marked.

SUMMARY

According to one aspect, a marking system may include a marker dispenser to hold and dispense a marker; a processor to determine at least one characteristic regarding the marker; and a triggering system in communication with the marker dispenser and the processor to trigger the marker dispenser to dispense the marker and the processor to store the at least one characteristic regarding the marker and time data associated with the dispensing of the marker.

According to another aspect, a marking tool may include a marker dispenser to hold and dispense a marker from a marker container. A tag may be affixed to the marker container, where the tag may store information regarding at least one characteristic of the marker. The marking tool may further include a tag reader to read the information from the tag, a processor to receive the information from the tag reader, and a triggering system to trigger the marker dispenser to dispense the marker from the marker container and the processor to store the information and time data associated with the dispensing of the marker by the marker dispenser.

According to yet another aspect, a method may include identifying a marker characteristic regarding a marker loaded into a marking tool; receiving activation of a trigger of the marking tool; dispensing the marker when the activation of the trigger is received; and storing the marker characteristic and time data when the activation of the trigger is received.

According to a further aspect, a system may include means for holding a container from which a marker is dispensed; means for identifying a marker characteristic regarding the marker in the container; means for receiving activation of a trigger; means for dispensing the marker from the container when the trigger is activated; and means for storing the marker characteristic and a timestamp when the trigger is activated.

According to another aspect, a system may include means for holding a container from which a marker is dispensed; means for identifying a marker characteristic regarding the marker in the container; means for receiving activation of a trigger; means for dispensing the marker from the container when the trigger is activated; and means for increasing a count value when the trigger is activated.

According to yet another aspect, a marking system may include means for providing a holder for a container from which a marker is dispensed; and means for identifying a marker characteristic regarding the marker in the container only when the container is initially placed into the holder.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIGS. 6A-6C are diagrams of exemplary entries that can created.

DETAILED DESCRIPTION

The following detailed description refers to the accompanying drawings. The same reference numbers in different drawings may identify the same or similar elements. Also, the following detailed description does not limit the invention.

Figure 1:
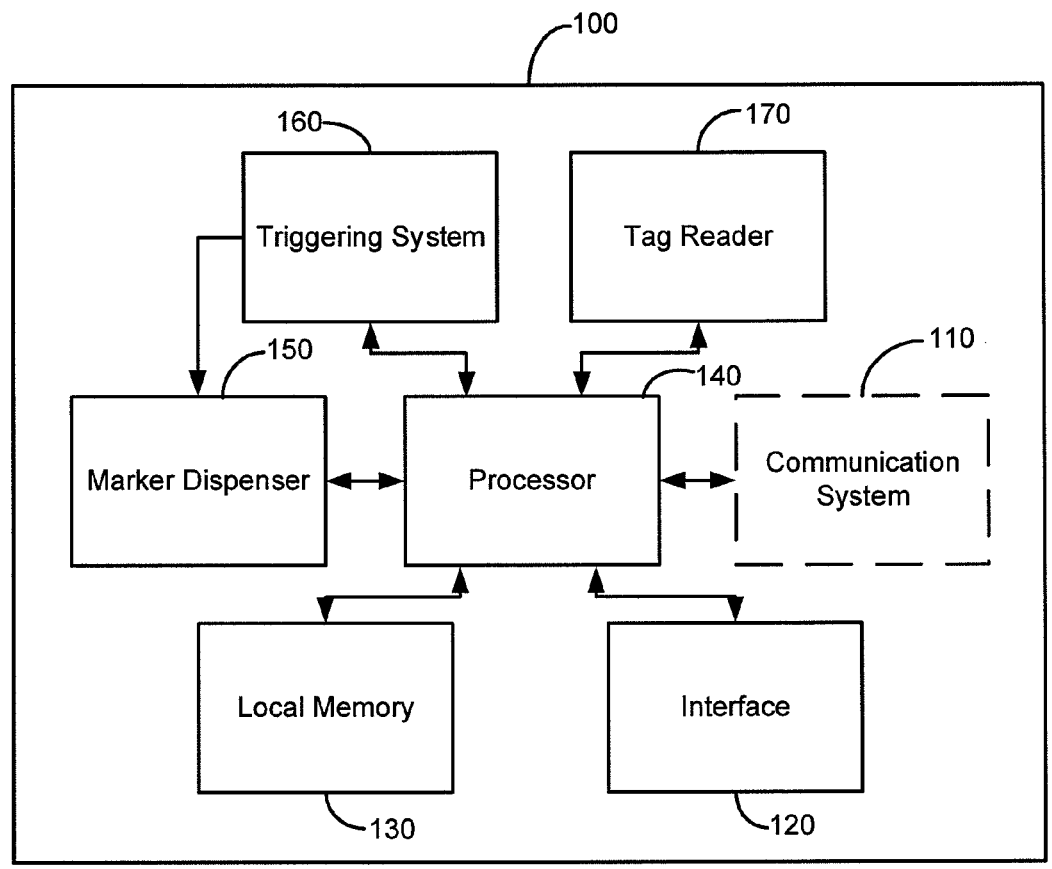
FIG. 1 is a block diagram of an exemplary marking system.

FIG. 1 is a block diagram of an exemplary marking system 100. The system 100 may include a communication system 110, an interface 120, a local memory 130, a processor 140, a marker dispenser 150, a triggering system 160 and a tag reader 170. In other implementations, system 100 may include additional or different components.

The system 100 may be used to dispense markers. In one exemplary application of the system 100, the markers may be used to mark underground utility lines, such as telecommunications (e.g., telephone and/or cable), power, gas, water, or sewer. The marker that is used to mark underground utility lines may include a liquid, such as paint, or objects, such as flags, stakes, etc.

A user may control the operation of the system 100 via interface 120. In one implementation, interface 120 may include a touch screen interface that can provide various operational controls and status indicators of the system 100, and can allow the user to navigate the controls by touching particular areas of the screen. In another implementation, the interface 120 may include another form of input and/or output, such as, for example, a display for displaying information and a keypad for entering information. In either situation, the interface 120 may provide operational controls to function as the triggering system 160.

The triggering system 160 may trigger the dispensing of markers and the storing of marking information. The marking information, which will be described in more detail below, may include information regarding a characteristic of the marker(s) being dispensed, time data (e.g., a timestamp and/or elapsed time information), and/or count data (e.g., a number of times that markers were dispensed). In operation, a user may engage a triggering mechanism in the triggering system 160 (explained in more detail below) in order to dispense the markers. When the triggering mechanism is engaged, the triggering system 160 may also initiate storing of the marking information. This may be done by sending a signal to the processor 140, which may cause processor 140 to store the marking information in local memory 130. Alternatively, or additionally, the processor 140 may store the marking information by transmitting the marking information for storage by a device or system external to system 100. In one implementation, marking information may be stored only when a marker is being dispensed by the marker dispenser 150.

The marker dispenser 150 may hold the markers and may also contain an actuation mechanism (not shown in FIG. 1) that causes the markers to be dispensed when the triggering system 160 is activated. As described above, the markers dispensed by the marker dispenser 150 may include a liquid (e.g., paint) or an object (e.g., flags or stakes). Details of the marker dispenser 150 will be discussed in more detail below.

The system 100 may also include a tag reader 170. In one implementation, tag reader 170 may include a device that can read tags. A "tag," as the term is used herein, may refer to any item that is capable of storing machine-readable information, such as a barcode, a radio frequency identification (RFID) device, or a near field communication (NFC) device. A tag may be passive, active, or any combination thereof. A passive tag may transmit data in response to signals received from tag reader 170. An active tag may continuously transmit data. Tags can be attached to the markers that are loaded into the marker dispenser 150 and can incorporate data that corresponds to one or more characteristics of the marker (e.g., paint color if the marker is paint). Other examples of marker characteristics include, but are not limited to, the type of marker and a shape of marker. The tag reader 170 may incorporate an antenna (not shown) to read the data from a tag (whether passive, active, or any combination thereof). The data read by the tag reader 170 can then be sent to the processor 140 for a determination of the corresponding characteristic. The corresponding characteristic can then be stored in local memory 130, displayed by the interface 120, and/or transmitted external to system 100.

Communication system 110 may include an interface for transmitting data to and/or receiving data from one or more external devices and/or systems located either local to or remote from the system 100. Communication system 110 may include any type of interface, such as an interface for communicating via Ethernet, Bluetooth, Wifi, radio frequency (RF), a wide area network (WAN), or another type of network or protocol.

In one implementation, communication system 110 may send marking information stored in local memory 130 to an external device/system and/or receive information from an external device/system. The marking information may be used by the external device/system to identify a marker dispensed by a user of system 100, identify a time at which the marker was dispensed, and/or determine an amount of the marker used at a particular location.

System 100, as broadly described herein, may be particularly suited for incorporation into marking tools for marking underground utilities. As discussed above, a marking tool is used to mark the ground, pavement or other surfaces in order to provide a visual indication of the location of underground utilities. The type of marker that may be used includes paint that may be supplied in aerosol canisters that are oriented axially with respect to the long axis of the aerosol canisters. The marking tool enables a user to walk or stand erect while dispensing the markers.

If system 100 is incorporated into a paint marking tool, a tag may be attached to the paint canisters to identify a characteristic of the paint, such as the color of the paint in the paint canister. The tag reader 170 can read this paint characteristic (e.g., the color information) from the tag when the paint canister is inserted into the marker dispenser 150, and the processor 140 can display the color information read by the tag reader 170 on the interface 120. Alternatively, or additionally, the color information may be provided to the user in other ways. For example, the color information may be audibly provided to the user (e.g., via a generated voice or a series of beeps or honks). The color information may also, or alternatively, be provided to the user visually in a manner other than via interface 120. For example, the color information may be provided on an object worn or carried by the user (e.g., a pair of glasses, a bracelet, a ring, etc. having display capabilities and/or being capable of changing color).

In one implementation, the processor 140 can estimate how much paint of a particular color has been dispensed. The processor 140 could do this by maintaining a separate timer for each color. The timer for a particular color would increase its count every time the triggering mechanism is activated and that color is mounted in the marker dispenser 150 (which can be determined by reading the tag on the paint canister using the tag reader 170). This information can be useful for managing paint inventory or determining whether the amount of paint used at a particular location is reasonable given the job to be performed at that location.

A paint marking tool is just one possible application of system 100. System 100 can be applied to any marking system that uses markers that can be affixed with tags. Any marker characteristic that a user would find useful can be stored on the tag that is affixed to the marker.

Figure 2:
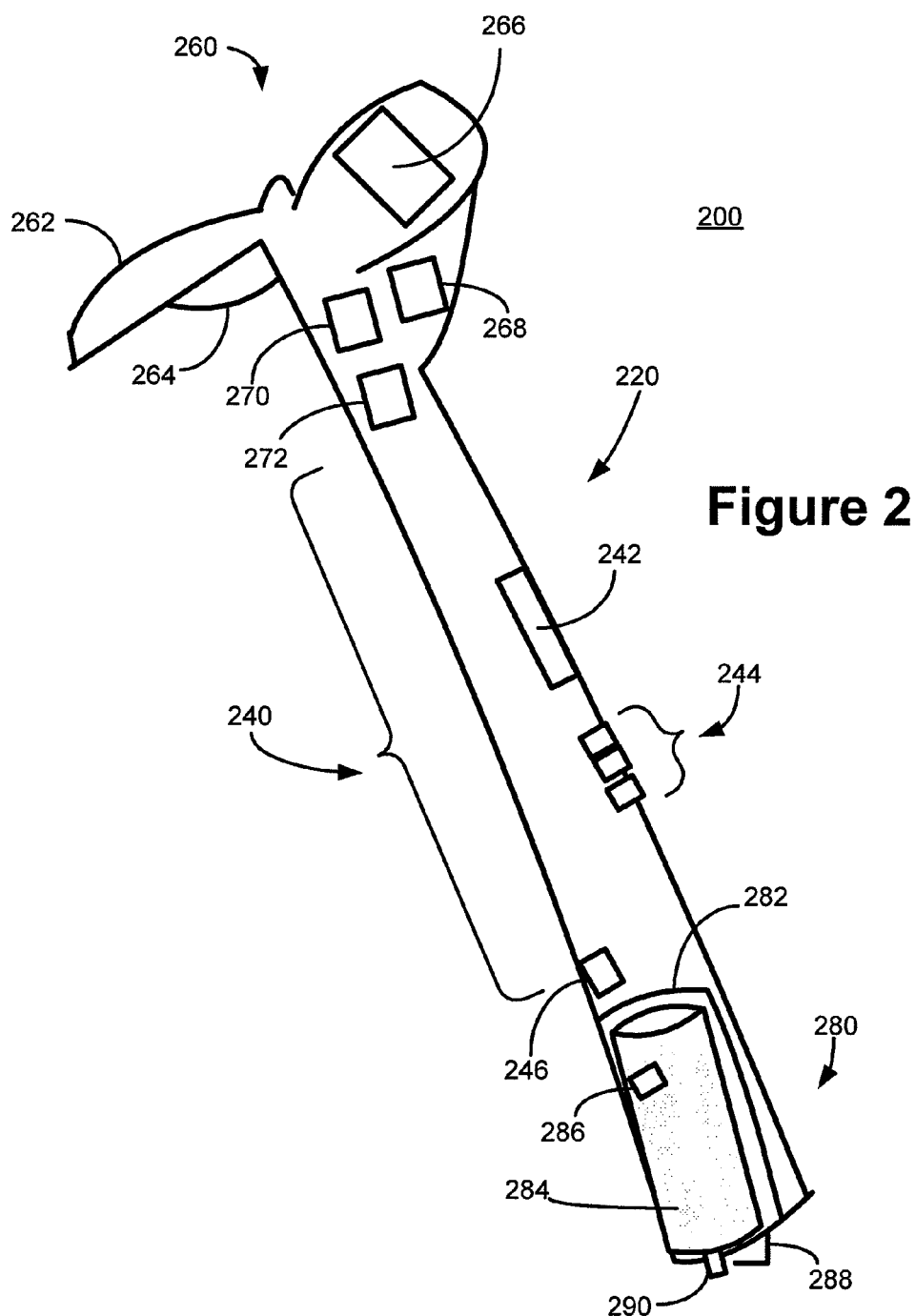
FIG. 2 is a diagram of an exemplary marking tool.

FIG. 2 is a diagram of an exemplary marking tool 200. For the description to follow, assume that the marking tool 200 uses paint as the marker. However, it should be appreciated that any other marker, such as another type of liquid, flags, stakes, etc., may be used in other implementations.

The marking tool 200 may include a housing 220 with an elongated center housing portion 240, a top housing portion 260 and a bottom housing portion 280. The housing 220 may be formed of any at least semi-rigid material, and may be formed of a lightweight material such as aluminum or plastic.

A paint canister holder 282 may be attached to the bottom housing portion 280. The paint canister holder 282 may include an open-ended tubular structure that is attached to the bottom housing portion 280 by any suitable attachment mechanisms, such as rivets, adhesive, mechanical fasteners or the like. The paint canister holder 282 may be formed of any material such as injection-molded plastic, formed sheet metal or any other appropriate material that may be fabricated into an open tubular configuration or any other configuration that will serve to support a paint canister 284 with the paint canister axis substantially parallel to the housing 220.

A tag reader 246, which may include a device that can read tags, may be mounted on or located within the housing 220. The tag reader 246 may incorporate an antenna (not shown) that is capable of reading data from a tag. When a tag 286 is attached to a paint canister 284 that incorporates data that corresponds to characteristics of the paint (e.g., paint color), the tag reader 246 may read that data. Other examples of marker characteristics include, but are not limited to, the type of marker and the shape of marker. The data read by the tag reader 246 can then be sent to a processor 268 for a determination of the corresponding characteristic. The corresponding characteristic can then be provided to the user, stored in local memory 270, and/or transmitted external to marking tool 200.

The tag reader 246 may be mounted anywhere on the housing or on the paint canister holder 282. However, the tag reader 246 does not have to be mounted anywhere on the marking tool 200 itself. For example, the tag reader 246 may be carried by a user. In general, the tag reader 246 may be mounted or located at any location, as long as it can receive data transmitted from the tag 286.

An actuation mechanism 288 may be attached to the bottom housing portion 280 at a location from which it can actuate the nozzle 290 of the paint canister 284. The actuation mechanism 288 may include a rigid material that depresses the nozzle 290 when actuated. However, any mechanism may be used to actuate the nozzle 290 of the paint canister 284.

A handle 262 may be provided at the top housing portion 260. The handle 262 may be formed of injection-molded plastic or any other appropriate material, and may be attached to the top housing portion 260 by rivets, adhesive, or any other suitable means. A mechanical trigger 264 may be provided on the top housing portion 260. The mechanical trigger 264 may be located on the handle 262 and attached using any suitable means.

The display 266 may be provided on the top housing portion 260. The display 266 may include a touch-screen display for displaying information to a user, as well as acting as an input device. The processor 268 and the local memory 270 are located in the housing 220. In one implementation, the processor 268 and local memory 270 may be located in the top housing portion 260 so as to be in close proximity to the display 266 and mechanical trigger 264. In another implementation, the processor 268 and local memory 270 may be located elsewhere within the housing 220.

A timer 272 may be provided on the top housing portion 260. The timer 272 may include any device that can output time data to some level of accuracy (e.g., accuracy to the minute, the second, the millisecond, etc.). In one implementation, the timer 272 may be capable of generating the time data itself. In this situation, the timer 272 may take the form of a clock. In another implementation, the timer 272 may receive the time data from another device external to marking tool 200. In this situation, the timer 272 may take the form of a receiver. In some situations, it may be beneficial for the timer 272 to be synchronized to another timer. The timer 272 may output time data to the processor 268.

A wireless communication antenna 242 may be located on the housing 220, and used to transmit data, such as marking information stored in local memory 270, to an external device/system and/or to receive information from an external device/system.

The marking tool 200 may also include one or more input/output ports 244, such as USB, SCSI, Firewire, Ethernet and/or other ports, for interfacing with other equipment and/or computers.

In operation, a user operates the marking tool 200 while standing or walking in an upright manner. A user may control the operation of the tool 200 via display 266, a mechanical trigger 264, and/or a wireless or wired (hereinafter "wireless/wired") interface that may be provided via wireless communication antenna 242 and/or input/output ports 244.

The various operational controls and status indicators of the tool 200 are displayed on display 266, and the user can also navigate the controls by touching particular areas of the display 266. Although a touch-screen display is one form of the display 266, any other type of display or interface may be used such as, for example, a display for displaying information and a keypad for entering information. The user may use the display 266 to trigger the dispensing of paint and the storing of marking information.

The mechanical trigger 264 may trigger the dispensing of paint and the storing of marking information. In one implementation, the tool 200 may store the marking information only when paint is being dispensed. This may be accomplished by using a mechanical trigger 264 that, when activated by the user, triggers both the actuation mechanism 288 for the paint canister 284 and the storing of the marking information by the processor 268.

The mechanical trigger 264 can trigger the actuation mechanism 288 via a mechanical connection between the trigger 264 and the actuation mechanism 288. For example, the actuation mechanism 288 can be a rigid material that is connected to the mechanical trigger 264 via a mechanical linkage (not shown), in which case depressing the mechanical trigger 264 may cause the actuation mechanism to apply pressure to the nozzle 290 of the paint canister 284. However, the mechanical trigger 264 may also, or alternatively, trigger the actuation mechanism 288 via an electronic connection. The electronic connection may be a hardwired connection or a wireless connection. If the connection between the mechanical trigger 264 and the actuation mechanism 288 is an electronic connection, the actuation mechanism 288 may include a mechanism for generating the force necessary to depress the nozzle 290 of the paint canister 284.

The wireless/wired interface may be capable of capturing signals that reflect a user's intent. For example, the wireless/wired interface may include a microphone that can capture a user's intent by capturing the user's audible commands. Alternatively, the wireless/wired interface may interact with a device that monitors a condition of the user, such as eye movement, brain activity, or heart rate. In either event, the wireless/wired interface may generate signals that may be sent to the processor 268 for processing. The processor 268 may use the signals to trigger the dispensing of paint and the storing of marking information.

Figure 3:
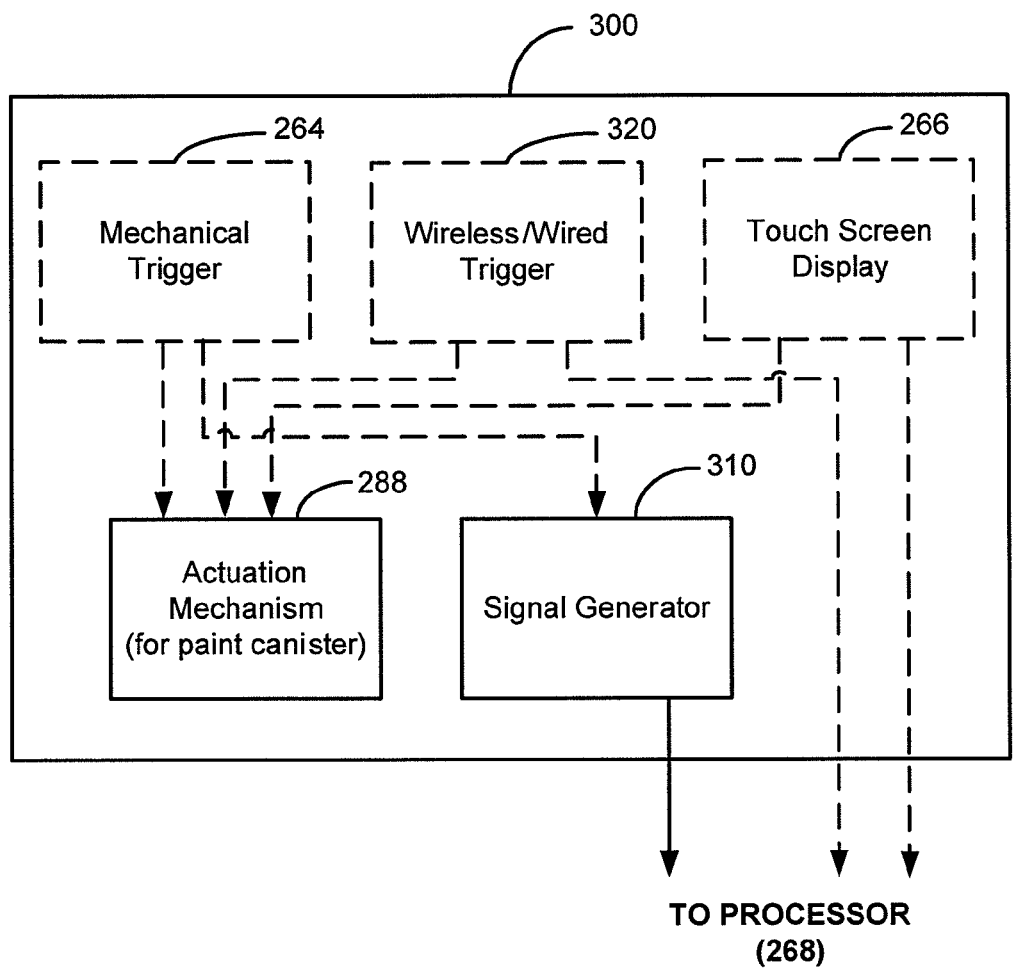
FIG. 3 is a diagram of an exemplary triggering system that may be used in the marking tool of FIG. 2.

FIG. 3 is a diagram of one embodiment of a triggering system 300 that may be used in the marking tool 200 of FIG. 2. As shown in FIG. 3, the triggering system 300 may include the mechanical trigger 264, a wireless/wired trigger 320, and/or a touch screen display 266, the mechanical actuation device 288, and a signal generator 310.

In operation, a user may trigger the storing of the marking information and the dispensing of paint by activating the mechanical trigger 264. The storing of the marking information and the dispensing of paint may also, or alternatively, be triggered by a trigger signal from wireless/wired trigger 320 or by choosing a command that is displayed on the touch screen display 266. It should be appreciated that triggering system 300 may include a mechanical trigger 264, a trigger signal from wireless/wired trigger 320, a trigger command on a touch screen display 266, or a combination of a mechanical trigger 264, a trigger signal from wireless/wired trigger 320, and/or a trigger command on a touch screen display 266 for initiating the storing of the marking information and the dispensing of paint.

When a user activates the mechanical trigger 264, the mechanical actuation device 288 and the signal generator 310 are both activated. The mechanical actuation device 288 actuates the nozzle 290 of the paint canister 284, thus dispensing paint out of the paint canister 284. The signal generator 310, when activated, sends a signal to the processor 268 indicating that the mechanical trigger is being activated. As discussed above, this signal could be used to trigger the storing of marking information and/or a timer for keeping track of how much paint of a particular color has been dispensed when a tag 286 that identifies the paint color is attached to the paint canister 284 that is mounted in the paint canister holder 282.

The mechanical trigger 264 can activate the mechanical actuation device 288 via a mechanical connection, e.g., a mechanical linkage, between the mechanical trigger 264 and the mechanical actuation device 288. Alternatively, the mechanical trigger 264 can activate the mechanical actuation device 288 via a wired or wireless electronic connection between the mechanical trigger 264 and the mechanical actuation device 288.

If a trigger signal from wireless/wired trigger 320 is used by the user to initiate marking information storing and paint dispersal, the wireless/wired trigger 320 may send a signal to both the mechanical actuation device 288 and the processor 268. The signal sent to the mechanical actuation device 288 by the wireless/wired trigger 320 may result in the actuation of the nozzle 290 of the paint canister 284 by the mechanical actuation device 288. The signal sent to the processor 268 by the wireless/wired trigger 320 may trigger the storing of the marking information. The signals sent by the wireless/wired trigger 320 to the mechanical actuation device 288 and the processor 268 may be sent via a wired or wireless connection.

If a command on the touch screen display 266 is used by the user to initiate storing of marking information and paint dispersal, the touch screen display 266 can send a signal to both the mechanical actuation device 288 and the processor 268. The signal sent to the mechanical actuation device 288 by the touch screen display 266 may result in the actuation of the nozzle 290 of the paint canister 284 by the mechanical actuation device 288. The signal sent to the processor 268 by the touch screen display 266 may trigger the storing of the marking information. The signals sent by the touch screen display 266 to the mechanical actuation device 288 and the processor 268 may be sent via a wired or wireless connection.

The marking information may be used by an external device and/or system to identify which markers were dispensed, when the markers were dispensed, and/or an amount of markers that were dispensed. The marking information may be useful to determine whether a user dispensed the correct marker(s) (e.g., the correct color paint) in a particular location. Also, the marking information may be used to visually depict (e.g., in real time as the dispensing occurs) or reconstruct (e.g., at a later time after the dispensing is complete) the dispensing of the markers on an electronic representation of the area that is currently being marked or was previously marked. Also, the marking information may be used to determine whether the job was completed correctly (e.g., that the amount of paint dispensed at the location was reasonable given the job that was to be performed at the location).

Figure 4:
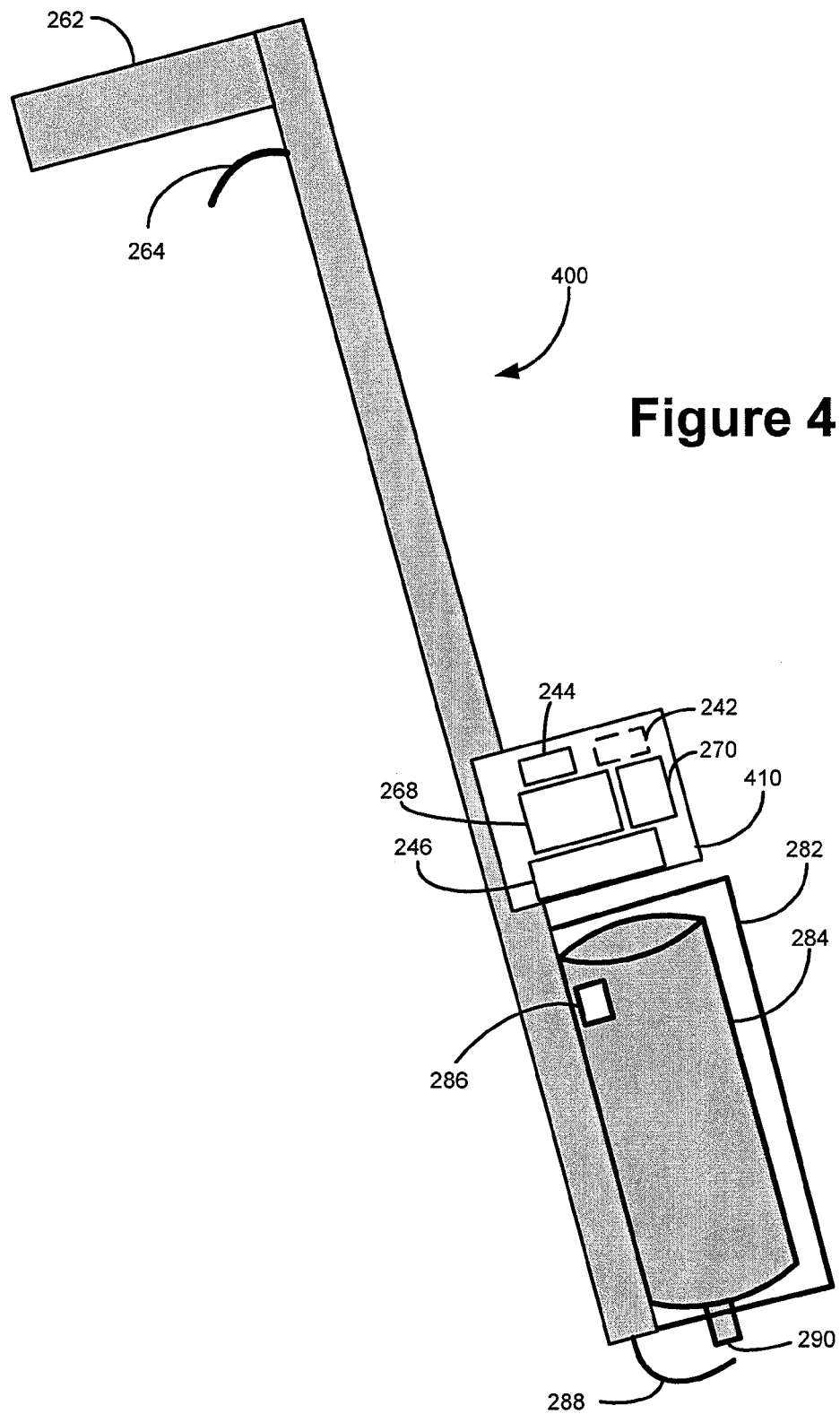
FIG. 4 is a diagram of another exemplary marking tool.

As shown in FIG. 4, the marking system 100 may be incorporated into already existing marking tools by locating the electronics on a board 410 that can be mounted onto an existing marking tool 400. The processor 268, local memory 270, input/output ports 244, tag reader 246 and/or wireless communication antenna 242 may be mounted on the board 410. The board 410 can be attached to the marking tool 400 using any means, such as with fasteners, clamps, glue, etc.

Figure 5:
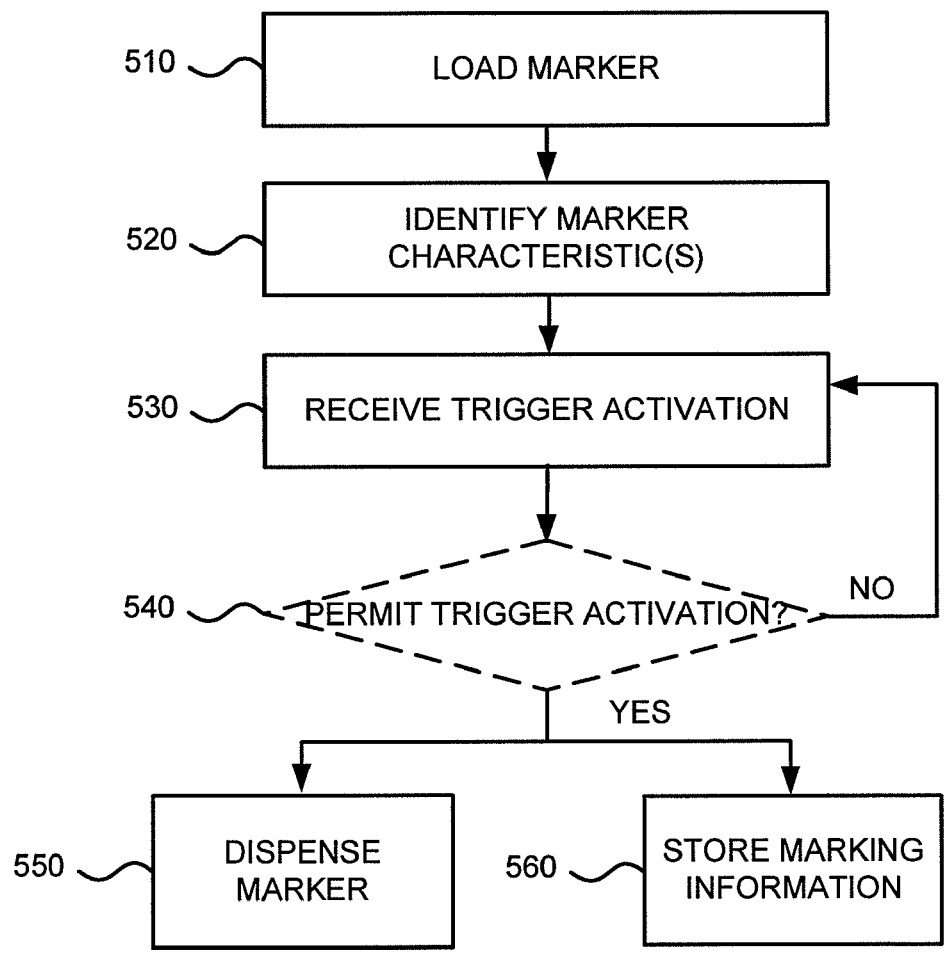
FIG. 5 is a flowchart of an exemplary process for marking an area.

FIG. 5 is a flowchart of an exemplary process for marking an area. The process of FIG. 5 may begin with a user of a marking tool, such as marking tool 200 (FIG. 2), being dispatched to a location to be marked. The user might be given a ticket that identifies what utilities the user needs to mark at the location. The ticket might specify, for example, the location to be marked, the day and/or time that the location is to be marked, and/or whether the user is to mark the location for telecommunications (e.g., telephone and/or cable), power, gas, water, and/or sewer. The user might arrive at the location and take his/her marking tool out of his/her vehicle. In some situations, the user might load his/her pockets with extra markers (e.g., extra canisters of the same color of paint or different colors of paint).

A marker may be loaded into the marking tool (block 510). For example, the user may load a paint canister 284 of the appropriate color into paint canister holder 282. If the user is going to mark power, for example, the user might load a paint canister 284 containing red paint. The paint canister 284 may be loaded such that nozzle 290 extends out of the bottom of the marking tool 200, as illustrated in FIG. 2.

In one implementation, as described above, a tag 286 may be affixed to the paint canister 284. The tag 286 may store information regarding one or more characteristics of the marker. For example, the tag 286 may identify the type of marker (e.g., paint, flag, stake, etc.), the color of marker (e.g., orange, red, yellow, blue, or green), and/or the shape of the marker (e.g., square, triangular, circular, etc.).

The marker characteristic(s) may be identified (block 520). In one implementation, the marker characteristic(s) may be automatically determined. For example, data from the tag 286 may be read by tag reader 246 and sent to processor 268. The processor 268 may determine the marker characteristic(s) from this data, and cause information regarding the marker characteristic(s) to be presented to the user (e.g., visually and/or audibly).

For example, a user interface may identify a characteristic of the marker. The user interface may optionally request the user to confirm that the user intended to load a marker with the identified characteristic. The confirmation may establish that the user actually looked at the user interface before performing any marking operation. In one implementation, the user may be unable to activate a trigger for dispensing a marker if the user does not confirm that the correct marker is loaded.

In another implementation, the marker characteristic(s) may be manually determined. For example, the user may specify the marker characteristic(s) via a user interface. The user interface may identify a number of possible characteristics (e.g., paint colors) of the marker. In this case, the user interface may request that that user select the paint color to be dispensed. The user interface may also identify the utility that corresponds to each of the possible paint colors so that the user can confirm that the correct marker is loaded.

Trigger activation may be received (block 530). For example, the user may effect trigger activation by applying pressure to the mechanical trigger 264 with his/her hand. Alternatively, or additionally, the user may effect trigger activation by, for example, speaking a particular command to cause a trigger signal to be output by wireless/wired trigger 320. Alternatively, or additionally, the user may effect trigger activation by touching a particular area of display 266 to cause a trigger command to be output by display 266.

It may optionally be determined whether to permit trigger activation (block 540). For example, the user may be required to confirm that a marker with the correct marker characteristic was loaded before trigger activation may be permitted. Alternatively, the marking tool 200 may be loaded with information from the user's ticket. In this case, trigger activation may be prevented when the marker characteristic of the marker does not match the ticket information. For example, if the ticket information indicates that the user is to dispense blue and yellow paint at a particular location, then activation of the trigger may be permitted if blue or yellow paint is loaded into the marking tool 200, and activation of the trigger may be prevented otherwise.

If activation of the trigger is permitted, then a marker may be dispensed (block 550), and marking information may be stored (block 560). To dispense a marker (block 550), the actuation device 288 may be activated to cause the nozzle 290 of the paint canister 284 to be depressed, which may cause paint from the paint canister 284 to be output via the nozzle 290.

To store marking information (block 560), a signal may be sent to the processor 268. The signal may be sent from the signal generator 310, the wireless/wired trigger 320, and/or the display 266, as described above. The signal may instruct the processor 268 to store the marking information. For example, the processor 268 may store the marking information in local memory 270. In this case, the processor 268 may create an entry in local memory 270. Alternatively, or additionally, the processor 268 may store the marking information by transmitting the marking information for storage by a device or system external to marking tool 200.

FIG. 6A is a diagram of an exemplary entry that may be created. As shown in FIG. 6A, an entry may include a marker characteristic(s) field 610 and a timestamp field 620. The marker characteristic(s) field 610 may include information regarding one or more marker characteristics, such as marker color, marker shape, or marker type. The information in the marker characteristic(s) field 610 is shown in FIG. 6A as "yellow" or "yellow paint"—although any type of descriptive information may be used. The timestamp field 620 may include time data that identifies the day and/or time that the marker was dispensed. The time data in the timestamp field 620 is shown in FIG. 6A as 10:45 a.m. on Oct. 20, 2005—although any type of date and/or time code may be used. As explained above, the marking information may be useful to determine whether the user dispensed the correct marker(s) (e.g., the correct color paint) in a particular location. For example, the user's ticket may identify what utility lines were to be marked in the area. The marking information may help insure that the job was completed correctly.

Figure 6B:
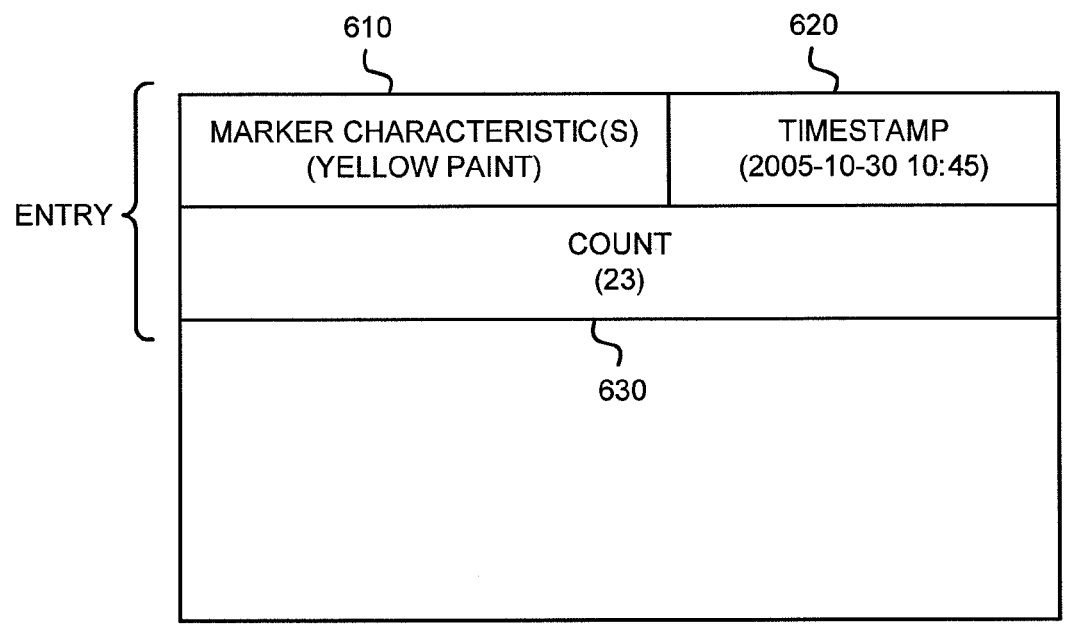

FIG. 6B is a diagram of another exemplary entry that may be created. As shown in FIG. 6B, an entry may include a marker characteristic(s) field 610, a timestamp field 620, and a count field 630. The marker characteristic(s) field 610 and the timestamp field 620 may be similar to the similarly named fields in FIG. 6A. The count field 630 may include information that identifies the number of times that the user activated the trigger to dispense a marker (e.g., yellow paint). The information in the count field 630 is shown in FIG. 6B as twenty-three—although any count value can be used. The information in the count field 630 may be useful to determine or estimate an amount of paint that was dispensed at the location and, thus, whether the amount of paint was reasonable given the job that was to be performed.

Figure 6C:
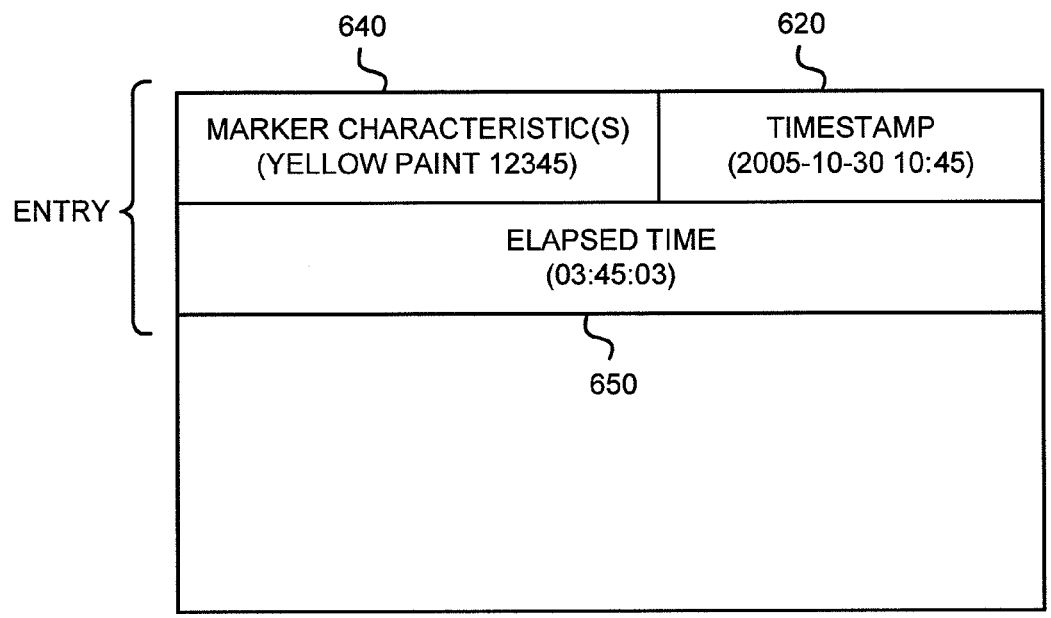

FIG. 6C is a diagram of another exemplary entry that may be created. As shown in FIG. 6C, an entry may include a marker characteristic(s) field 640, a timestamp field 620, and an elapsed time field 650. The marker characteristic(s) field 640 and the timestamp field 620 may be similar to the similarly named fields in FIG. 6A. In this case, however, the marker characteristic(s) field 640 may additionally store an identifier that identifies a particular marker (e.g., a particular canister of paint). The identifier is shown in FIG. 6C as "12345"—although any type of identifier may be used.

The elapsed time field 650 may include information that identifies the amount of time that has elapsed from when the user activated the trigger for dispensing a marker (e.g., yellow paint) to when the user ceased activating the trigger. The information in the elapsed time field 650 is shown in FIG. 6C as three minutes, forty five seconds, and three one hundredths of a second—although any time code can be used. The information in the elapsed time field 650 may be useful to determine or estimate when a supply of markers is nearly empty. The information in the elapsed time field 650 may help determine when to replace the canister. The elapsed time or a signal indicating that a supply of markers needs to be replaced may be presented to the user visually and/or audibly. The information in the elapsed time field 650 may also, or alternatively, be useful to determine or estimate an amount of markers used in a particular location.

While three exemplary entries have been described with regard to FIGS. 6A-6C, an entry may include more, fewer, different, or combinations of the fields shown in FIGS. 6A-6C.

The foregoing description is not intended to be exhaustive or to limit the description to the precise form disclosed. Modifications and variations are possible in light of the above disclosure or may be acquired from practice of the invention.

For example, the processors 140 and 268 can be general purpose computers. Alternatively, they can be special purpose computers, programmed microprocessors or microcontrollers and peripheral integrated circuit elements, ASICs or other integrated circuits, hardwired electronic or logic circuits such as discrete element circuits, programmable logic devices such as FPGA, PLD, PLA or PAL or the like. In general, any device capable of executing code can be used to implement processors 140 and 268. Local memories 130 and 270 can be implemented with any type of electronic memory and/or storage device using any type of media, such as magnetic, optical or other media.

Further, while a series of blocks have been illustrated in FIG. 5, the order of the blocks may differ in other implementations. Also, non-dependent blocks may be performed in parallel.

Also, it has been described that information regarding an elapsed time can be used to determine or estimate when a supply of markers is nearly empty. In another implementation, a sensor may be used to detect a weight of a paint canister 284. The sensor may be placed on the paint canister 284 or within the paint canister holder 282. The weight of the paint canister 284 may be used to estimate how full or empty the paint canister 284 is. This information may be provided to an operator of the marking tool 200 visually and/or audibly. In one implementation, replacing the paint canister 284 may trigger the identification of the marker characteristic (e.g., paint color) by the tag reader 246. This may help reduce the overall battery life of the tag reader 246 and/or the tag 286 by limiting the number of times that the tag reader 246 is used (e.g., only obtain the marker characteristic when the paint canister 284 is initially loaded into paint canister holder 282).

It will be apparent that aspects, as described above, may be implemented in many different forms of software, firmware, and hardware in the implementations illustrated in the figures. The actual software code or specialized control hardware used to implement these aspects is not limiting of the description provided herein. Thus, the operation and behavior of the aspects were described without reference to the specific software code—it being understood that software and control hardware can be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The invention claimed is:

1. A system for electronically displaying information relating to use of a marking system or a marking tool configured to dispense one or more markers to mark, on ground, pavement, or other surface, a location of an underground utility, the system comprising:
   a processor to receive marking information relating to the use of the marking system or the marking tool;
   a tag reader communicatively coupled to the processor; and
   a display device communicatively coupled to the processor,
   wherein:
   the processor electronically receives at least some of the marking information from the tag reader; and
   the processor uses the marking information to control the display device so as to visually display a dispensing of the one or more markers on an electronic representation of an area that is marked and includes the location of the underground utility.

2. The system of claim 1, wherein the marking information includes:
   data corresponding to one or more characteristics of the one or more markers being dispensed;
   a timestamp and/or elapsed time information; and/or
   count data indicating a number of times that the one or more markers are dispensed.

3. The system of claim 1, wherein the processor uses the marking information to control the display device so as to visually depict in real time, as dispensing of the one or more markers occurs, the dispensing of the one or more markers on the electronic representation of the area that is marked and includes the location of the underground utility.

4. The system of claim 1, wherein the processor uses the marking information to control the display devices so as to visually reconstruct, at a later time after dispensing of the one or more markers is complete, the dispensing of the one or more markers on the electronic representation of the area that is marked and includes the location of the underground utility.

5. The system of claim 1, wherein the processor receives the marking information in response to activation of a triggering system associated with the marking system or the marking tool.

6. The system of claim 5, further comprising the marking system or the marking tool, wherein the marking system or marking tool comprises:
   a marker dispenser to dispense the one or more markers, wherein the marker dispenser dispenses the one or more markers in response to the activation of the triggering system.

7. The system of claim 1, wherein the processor electronically receives the marking information upon dispensing of the one or more markers.

8. The system of claim 1, further comprising the marking system or the marking tool, wherein the marking system or marking tool comprises:
   the processor; and
   a local memory,
   and wherein the processor electronically logs the marking information in the local memory of the marking system or the marking tool upon the use of the marking system or the marking tool.

9. The system of claim 1, wherein the processor is an external device located local to or remote from the marking system or the marking tool, and wherein the system further comprises:
   a communication system coupled to the processor to electronically receive the marking information from the marking system or the marking tool.

10. The system of claim 1, further comprising the marking system or the marking tool, wherein the marking system or the marking tool includes the display device.

11. The system of claim 1, wherein the tag reader is configured to read the at least some of the marking information from a barcode, a radio frequency identification (RFID) device, or a near field communication (NFC) device.

12. The system of claim 1, wherein the tag reader is configured to read passive tags and/or active tags.

13. The system of claim 1, wherein the at least some of the marking information read by the tag reader includes data that corresponds to one or more characteristics of the one or more markers.

14. The system of claim 13, wherein the one or more characteristics of the one or more markers include a color of the one or more markers, a type of the one or more markers and/or a shape of the one or more markers.

15. The system of claim 14, wherein the one or more markers include a paint, and wherein the one or more characteristics include a color and/or a type of the paint.

16. A system for electronically displaying information relating to use of a marking system or a marking tool configured to dispense one or more markers to mark, on ground, pavement, or other surface, a location of an underground utility, the system comprising:
   the marking system or the marking tool;
   a processor communicatively coupled to the marking system or the marking tool to receive marking information relating to the use of the marking system or the marking tool, wherein the processor electronically logs the marking information in response to activation of a triggering system associated with the marking system or the marking tool;
   a tag reader communicatively coupled to the processor, wherein the processor electronically receives at least some of the marking information from the tag reader, the at least some of the marking information including data that corresponds to one or more characteristics of the one or more markers; and
   a display device communicatively coupled to the processor,
   wherein the processor uses the marking information to control the display device so as to visually display a dispensing of the one or more markers on an electronic representation of an area that is marked and includes the location of the underground utility.

17. A method for electronically displaying information relating to use of a marking system or a marking tool configured to dispense one or more markers to mark, on ground, pavement, or other surface, a location of an underground utility, the method comprising:
 A) electronically receiving marking information relating to the use of the marking system or the marking tool; and
 B) using the marking information to visually display, on a display device, a dispensing of the one or more markers on an electronic representation of an area that is marked and includes the location of the underground utility;
 wherein A) comprises:
 A1) electronically logging at least some of the marking information; and
 prior to A1), receiving the at least some of the marking information from a tag reader.

18. The method of claim 17, wherein the marking information includes:
 data corresponding to one or more characteristics of the one or more markers being dispensed;
 a timestamp and/or elapsed time information; and/or
 count data indicating a number of times that the one or more markers are dispensed.

19. The method of claim 17, wherein B) comprises:
 B) using the marking information to visually depict in real time, as dispensing of the one or more markers occurs, the dispensing of the one or more markers on the electronic representation of the area that includes the location of the underground utility.

20. The method of claim 17, wherein B) comprises:
 B) using the marking information to visually reconstruct, at a later time after dispensing of the one or more markers is complete, the dispensing of the one or more markers on the electronic representation of the area that includes the location of the underground utility.

21. The method of claim 17, further comprising:
 C) activating a triggering system associated with the marking system or the marking tool to electronically log the marking information received in A).

22. The method of claim 21, wherein C) comprises:
 activating the triggering system to electronically log the marking information and dispense the one or more markers.

23. The method of claim 17, wherein A) comprises:
 electronically logging the marking information upon dispensing of the one or more markers.

24. The method of claim 17, wherein A) comprises:
 electronically receiving the marking information at one or more external devices located local to or remote from the marking system or the marking tool.

25. The method of claim 17, wherein A) comprises:
 electronically logging the marking information in local memory of the marking system or the marking tool.

26. The method of claim 17, wherein the at least some of the marking information includes data that corresponds to one or more characteristics of the one or more markers, and wherein the one or more characteristics include a color of the one or more markers, a type of the one or more markers, and/or a shape of the one or more markers.

27. The method of claim 17, wherein the marking system or the marking tool includes the display device.

28. A method for electronically displaying information relating to use of a marking system or a marking tool configured to dispense one or more markers to mark, on ground, pavement, or other surface, a location of an underground utility, the method comprising:
 A) dispensing the one or more markers so as to mark the location of the underground utility;
 B) electronically logging marking information in connection with A);
 B1) prior to B), receiving the marking information from a tag reader; and
 C) using the marking information to visually display the dispensing of the one or more markers in A) on an electronic representation of an area that is marked and includes the location of the underground utility.

29. At least one computer-readable storage medium encoded with instructions that, when executed by a processor in a computer, perform a method for electronically displaying information relating to use of a marking system or a marking tool configured to dispense one or more markers to mark, on ground, pavement, or other surface, a location of an underground utility, the method comprising:
 A) electronically receiving marking information relating to the use of the marking system or the marking tool; and
 B) using the marking information to visually display, on a display device, a dispensing of the one or more markers on an electronic representation of an area that is marked and includes the location of the underground utility,
 wherein A) comprises:
 A1) electronically logging at least some of the marking information; and
 prior to A1), receiving the at least some of the marking information from a tag reader.

* * * * *